BAILEY & ALLARD.
Whiffletree.
No. 13,297.
Patented July 24, 1855.
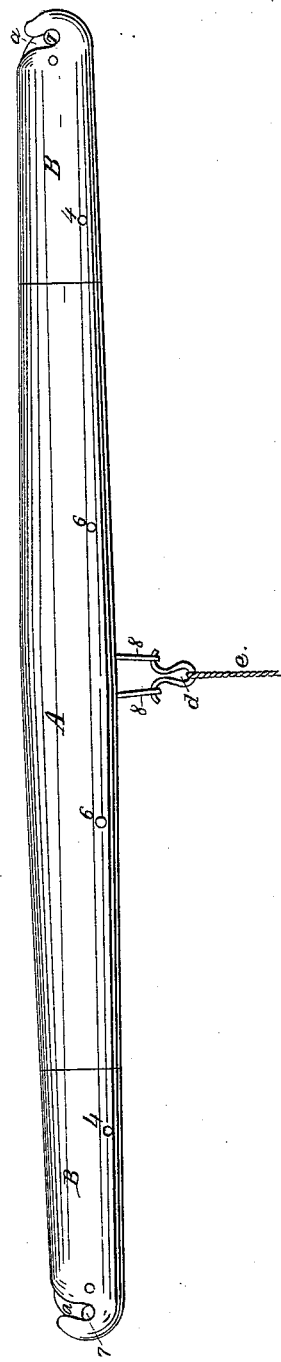
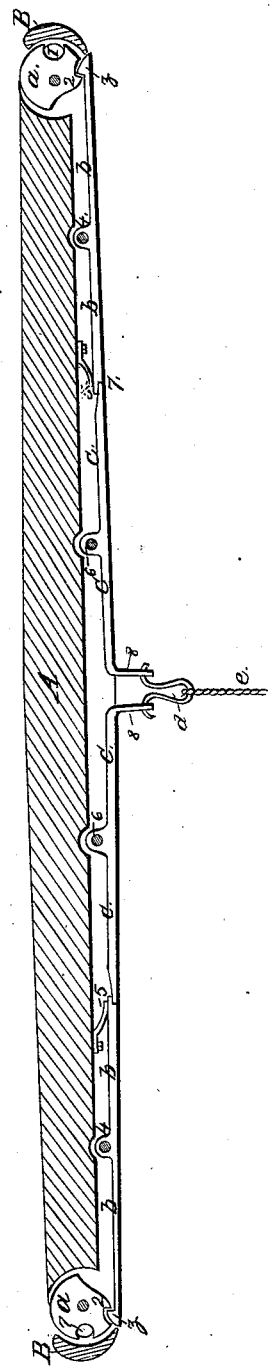

UNITED STATES PATENT OFFICE.

ARCHIBALD BAILEY, OF BLUE ROCK, AND DANL. N. ALLARD, OF ROKEBAY, OHIO.

WHIFFLETREE.

Specification of Letters Patent No. 13,297, dated July 24, 1855.

*To all whom it may concern:*

Be it known that we, ARCHIBALD BAILEY, of Blue Rock, in the county of Muskingum and State of Ohio, and DANIEL N. ALLARD, of Rokebay, in the county of Morgan and State aforesaid, have made certain new and useful Improvements in the Construction of Swingletrees to Facilitate the Disconnecting of the Traces Therefrom, and that the following is a full, clear, and exact description of the same, reference being had to the accompanying drawings, making a part thereof, in which—

Figure 1 represents a top view of a swingle tree in its position as connected to a carriage, and Fig. 2 represents a horizontal section through the center of Fig. 1 to represent the manner of connecting and operating the several parts.

Similar letters in both figures refer to like parts.

We are aware that a swingle tree has been made much resembling ours in its general appearance and operation, but there exists a difficulty in its certain disconnection, owing to the manner in which the levers that released the cock-eyes of the traces were arranged and operated. In the swingle-tree above aluded to, the hooks, to which the cock-eyes were fastened, were on the end, and a part of the levers themselves, and these levers must have room to swing back a considerable distance before they released the cock-eyes. It was found that these levers were liable to catch or strike against the double-trees, or cross bar behind them, and would not of course move far enough to release the traces. On this account they were not to be relied upon, and besides, such an arrangement was unsightly.

The nature of our invention consists in the use of a cam or cams in connection with the levers which hold or release them, and to which cams the cock-eyes of the traces are hooked, so that the whole may be embedded and act in the swingle-tree, which insures their action against any contiguous parts and makes a much neater swingle tree.

To enable others skilled in the art to make and use our invention, we will proceed to describe the same with reference to the drawings.

A, represents the body of the swingle tree, which may be of wood and capped at the ends by metallic caps B, which have openings in them to admit the cock-eyes on the traces. To the ends of the swingle tree, and within the caps B, are hung the cam-shaped hooks or catches $a$, $a$, on center pins, upon which they may turn, said hooks or catches $a$, $a$, being provided with a circular opening 1, into which the cock-eyes take, and a catch or shoulder 2, into which the projections 3, on the levers $b$ take. The levers $b$, are pivoted at 4, and have each a spring 5 behind them to hold the projections 3 into or against the shoulders 2 of the hooks $a$, $a$, to prevent said hooks, unless purposely released, from turning. $c$, $c$, are other levers, and like those $b$ $b$, are let into the back of the swingle tree, in a groove, so as to be concealed from sight, and protected in their action against anything behind them. These levers $c$, $c$, are pivoted at 6, and their points 7, overlap on the ends of the levers $b$, as seen in Fig. 2. To the ends of the levers $c$, $c$, nearest each other, and near the center of the swingle tree are arms 8, turned at right angles to the levers $c$, and united by a common hook $d$, to which a cord $e$, is attached, and which cord extends to some convenient place near the driver.

If in case of accident it becomes necessary to detach the horse, or horses, from the carriage, the cord $e$, is drawn up, which forces in the ends 7, of the levers $c$, giving a simultaneous movement to the levers $b$, which in turn draw the projections 3 out of the notches 2, and allow the cam hooks $a$, to turn on their center pins, and allow the cock-eyes to pass out of their catches, and thus be disconnected, no one part moving out of its appropriate place. To connect the cock-eyes to the catches or hooks $a$, after they have been thrown out, the cock-eye is placed in its opening 1, and the catch $a$, turned back until the projection 3, takes into its opening 2, when the whole is firmly held until again released.

Having thus fully described the nature of our invention, we would state that we are aware that hooks or catches have been placed in the ends of the levers themselves, but such an arrangement is objectionable, for reasons which we have stated, and we do not claim any such construction; but What we do claim as of our invention and desire to secure by Letters Patent is, In combination with the compound levers *b*, *c*, arranged and operated as herein described, the pivoted cam-shaped catches or hooks *a*, *a*, for holding, or instantly releasing the cock-eyes of the traces, by which arrangement we secure the parts against imperfect action, and are enabled to embed all the parts within the swingle tree as described.

ARCHIBALD BAILEY.
    D. N. ALLARD.

Witnesses:
 MATILDA SWINGLE,
 HIRAM M. ALLARD.